S. WADMAN.
ADVERTISING APPARATUS.
APPLICATION FILED FEB. 13, 1914.
1,230,348.
Patented June 19, 1917.
2 SHEETS—SHEET 2.
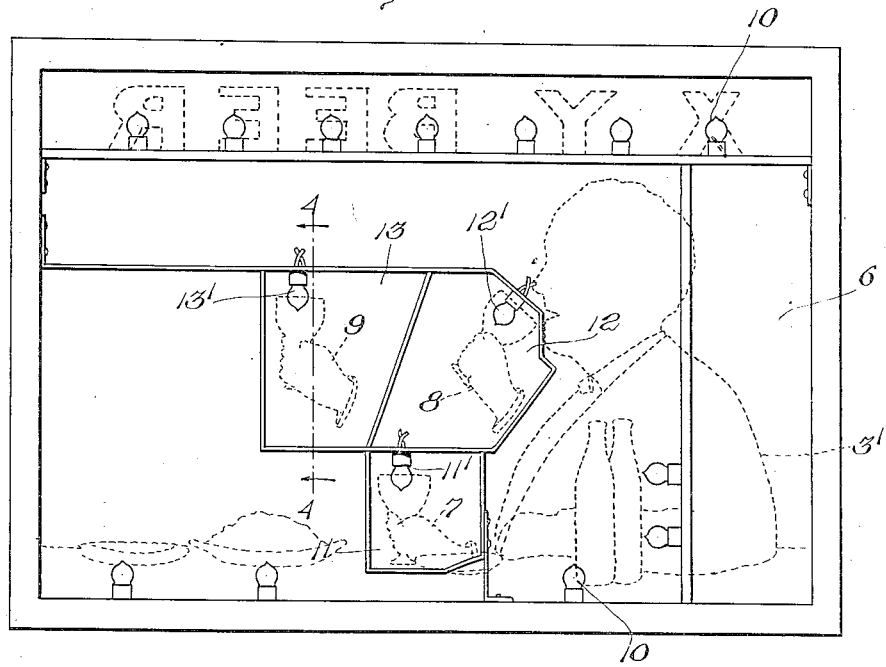
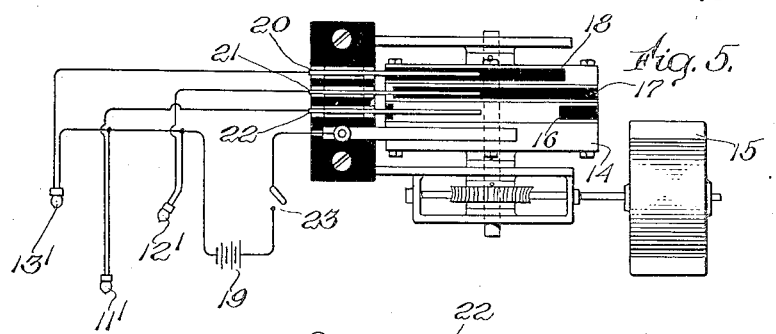
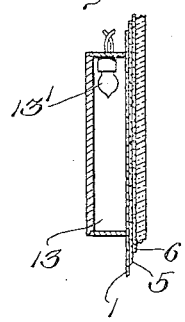
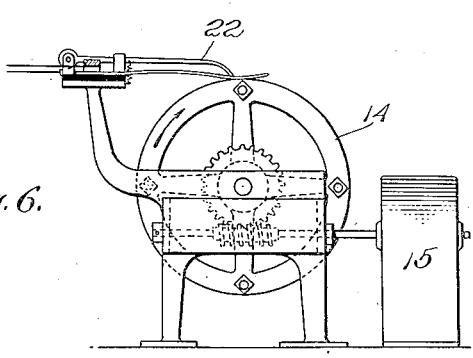
Witnesses:
Daniel J. Lyne
Stewart C. Woodworth
Sydney Wadman, Inventor:
by A. M. Holmes.
Atty.

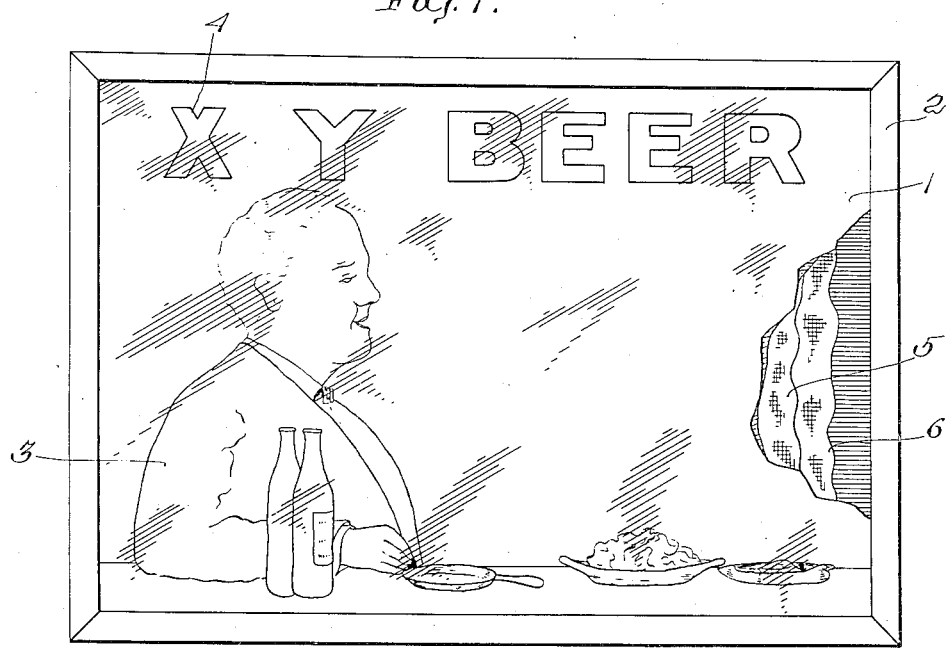
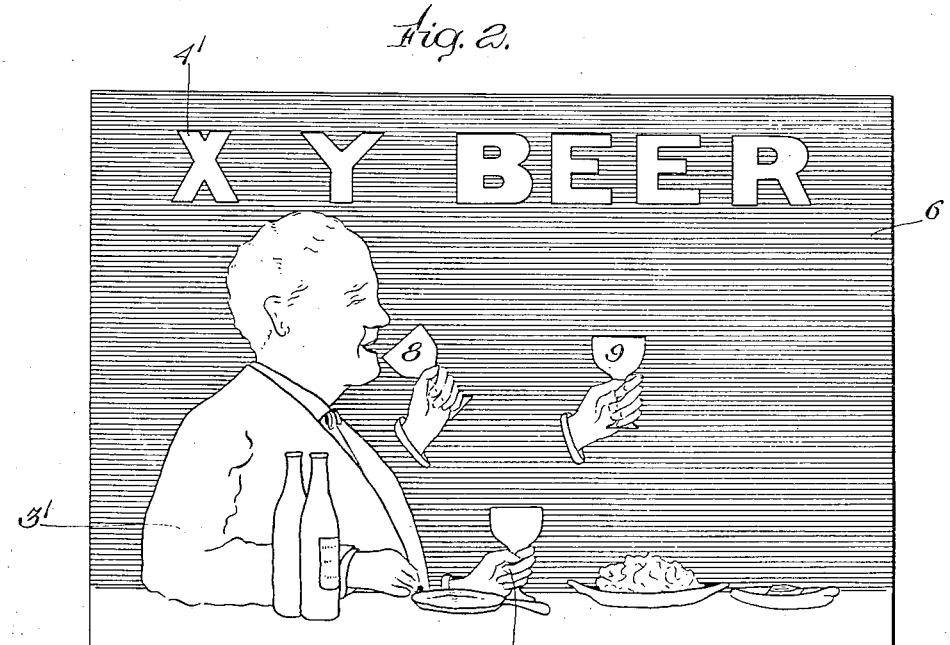

UNITED STATES PATENT OFFICE.

SYDNEY WADMAN, OF BOSTON, MASSACHUSETTS, ASSIGNOR TO THE ANIMATED ADVERTISING COMPANY, A CORPORATION OF MASSACHUSETTS.

ADVERTISING APPARATUS.

1,230,348.          Specification of Letters Patent.          Patented June 19, 1917.

Application filed February 13, 1914. Serial No. 818,553.

*To all whom it may concern:*

Be it known that I, SYDNEY WADMAN, a citizen of the United States, residing at Boston, in the county of Suffolk and Commonwealth of Massachusetts, have invented new and useful Improvements in Advertising Apparatus, of which the following is a specification.

This invention has for its object to provide simple and effective means and apparatus for producing an advertising display, useful by day or night, in which there may be a simulation of motion in a pictorial representation.

By the plurality of screens in my apparatus certain features are hidden until illuminated, thereby permitting a display which is useful and attractive by day and the startling effect of the appearance, when desired, of features otherwise hidden from view, and by which there may be a simulation of motion. Moreover, the plurality of screens makes possible an infinite variety of effects and rich coloring.

My novel apparatus is illustrated in the accompanying drawing in a form which I have found to produce good results. By way of illustration, these attached drawings show in a preferred embodiment an advertising display in which there is a simulation of motion, and which pictures a man who moves his hand to three successive positions.

Figure 1 is a front elevation of the apparatus, broken away to show the different screens; Fig. 2 is a front elevation of the back screen; Fig. 3 is a rear view of the apparatus; Fig. 4 is a cross section on lines 4—4 of Fig. 3; Fig. 5 is a plan view of the electric flashing device, showing diagrammatically the circuits for the lights; and Fig. 6 is a side elevation of the flashing device.

In the drawings, 1 is a canvas or screen, preferably of cotton or other translucent fabric, stretched in a frame 2. On the screen is shown the head and shoulders of a man, 3, seated at a table. Lettering 4, may also be shown on screen 1. Behind and adjacent to the front or display screen 1 is a suitable screen 5 of similar material, which is a hiding and toning screen. It serves to hide from view the screen 6 and the configurations or pictorial representation thereon, presently to be described, until said configurations are illuminated from behind. Screen 5 also tones down harsh colors, which it is necessary to use on the pictorial representations on screen 6 so that their appearance upon illumination is natural and lifelike. Behind and adjacent to screen 5 I stretch the screen 6, on which is painted or drawn figure 3' with the table, etc., (see Fig. 2) and lettering 4', being copies of 3 and 4 on screen 1 and so positioned that the figures 3 and 3' and the lettering 4 and 4' coincide in outline. Also on screen 6 is painted in three positions a hand which is to simulate movement, shown at 7, 8 and 9, Fig. 2. Except for 3', 4', 7, 8 and 9, the screen 6 is painted black, or in any other manner rendered opaque, as illustrated in Fig. 2. Lights 10, 10, which may be permanently lighted when the sign is illuminated, illuminate the figures and letters 3, 3' and 4, 4'. Open pockets of metal or like material, each inclosing an electric lamp, are shown at 11, 12 and 13 (Fig. 3). Fig. 4 shows the side elevation of pocket 13 with the inclosed light 13'. The front and open side of each pocket is covered by the screen 6, the whole forming a pocket substantially invisible except when its particular inclosed light is illuminated. As shown in Fig. 3, the pocket 11 is so positioned that it frames hand 7 on screen 6, and pockets 12 and 13 similarly frame hands 8 and 9 respectively.

Figs. 5 and 6 show an electric device for flashing at predetermined intervals the lights 11', 12' and 13'.

The switch member is a cylinder, 14, rotated by a motor, 15. The cylinder is cut away or insulated at 16, 17 and 18. The circuit from battery 19 is completed by contact fingers 20, 21 and 22 through lamps 11', 12' and 13', which are thereby illuminated and extinguished in succession at predetermined intervals of time.

When the display is to be illuminated, as at night, lamps 10, 10, are permanently lighted, illuminating 3, 3' and 4, 4'. When desired, switch 23 is closed and motor 15 started. Contact finger 22 being in contact with the drum 14, as shown in Fig. 5, the circuit is completed through lamp 11', which illuminates the hand 7, creating the illusion that the man has moved his left hand to the position shown. After a predetermined interval, as the drum 14 rotates, finger 22 reaches the insulated strip 16 and simultaneously finger 21 leaves the insulated strip 17 and completes the circuit through lamp 12'. Simultaneously, therefore, hand 7 disappears and hand 8 appears, giving the appearance of a motion of the hand to this new position. Again, after a predetermined interval, and as described, light 12' is extinguished and light 13' illuminates hand 9. Similarly, the hand may be lowered and the operation repeated.

The middle screen 5 hides screen 6 and everything thereon from view until the lamps are lighted. During the day and when the lamps are not lighted only the display on screen 1 is visible, but this may form an attractive display, valuable for advertising. At night and when the lamps are lighted and the flasher is working the additional features of the display appear and movement may be simulated. It will be readily understood that countless variations and motions can be worked out for any particular advertising purpose.

I find that I can get the best effects by painting on bleached cotton. The middle screen, 5, is preferably of unbleached cotton and should be of such texture as to hide the screen 6 and the configurations thereon until the lamps are lighted, and yet to permit the hands 7, 8 and 9 to show clearly and to be of identical appearance with figure 3 when illuminated. Furthermore, if figure 3, for example, on screen 1 is so tinted as to be attractive and lifelike by day, it is not attractive when illuminated from behind unless harsher colors are used on 3', on screen 6. With the two together, however, and the toning screen 5 between, the colors are softened, and a lifelike picture results when lamps 10, 10 are lighted.

Although the form of apparatus just described is a preferred form and is found to produce good results, I do not wish to be limited to these details. The number of screens may be varied without departing from the essence of my invention. Nor do I wish to be limited to fabric screens, as paper or other material may be used for one or more of the screens. The pictorial and other displays on the various screens need not be painted, but may be produced by any other suitable means, although I believe a painted cotton screen to be best. While I prefer to reproduce on the rear screen the same display as on the front screen, this is not essential so long as the rear screen permits a proper light outlet for the illumination of the display on the front screen.

I claim as my invention:

1. An advertising apparatus, comprising a display screen bearing a pictorial representation, a screen behind said display screen and bearing one or more pictorial representations, means for illuminating the pictorial representation on the display screen from behind, means for illuminating from behind one or more picture bearing portions of the rear screen at desired intervals, and means for hiding the same from view until illuminated, one or more of the pictorial representations on the rear screen being so positioned that upon illumination each appears as an addition to the pictorial representation on the display screen.

2. An advertising apparatus comprising a display screen bearing a pictorial representation, behind the display screen a rear screen bearing a pictorial representation, means for illuminating from behind the pictorial representation on the display screen, means for hiding from view the pictorial representation on the rear screen except when the same is illuminated from behind, and means for illuminating at desired intervals selected portions of the pictorial representation on the rear screen.

3. An advertising apparatus comprising a display screen bearing a pictorial representation, a rear screen bearing a pictorial representation, a portion of which is a substantial duplicate of the pictorial representation on the display screen and so positioned that the two register in outline, lights behind said portion of the rear screen for illuminating the pictorial representation on the display screen and its duplicate on the rear screen, a compartment behind another portion of the pictorial representation on the rear screen, means for illuminating the compartment at desired intervals, and between the said two screens a screen for hiding from view the pictorial representation on the rear screen except when the same is illuminated from behind as aforesaid.

4. An advertising apparatus comprising a pictorial representation visible without illumination, means for illuminating the same from behind, a pictorial representation behind said first pictorial representation, means for illuminating the same at desired intervals, and means for hiding it from view except when illuminated, said second pictorial representation being so positioned with reference to the first pictorial representation as to appear upon illumination as an addition thereto.

5. An advertising apparatus comprising a translucent display screen of fabric bearing a pictorial representation, a rear screen of fabric bearing a pictorial representation, means for illuminating from behind the pictorial representation on the display screen, means for illuminating from behind at predetermined intervals selected portions of the pictorial representation on the rear screen, and between the two screens a screen for hiding from view the pictorial representation on the rear screen except when the same is illuminated.

6. An advertising apparatus comprising a fabric display screen bearing a pictorial representation, a rear screen of fabric, bearing a pictorial representation, a portion of which is a substantial duplicate of the pictorial representation on the display screen and so positioned that the two register in outline, lamps for illuminating the pictorial representation on the display screen through its duplicate on the rear screen, a compartment behind another portion of the pictorial representation on the rear screen and means for illuminating said compartment at predetermined intervals, and between the display and rear screens a translucent fabric screen of proper texture to hide from view the pictorial representation on the rear screen except when the said pictorial representation is illuminated as aforesaid.

7. An advertising apparatus comprising a translucent fabric display screen bearing a pictorial representation, a rear screen of fabric, partly translucent and partly opaque and bearing a pictorial representation, a portion of which is a substantial duplicate of the pictorial representation on the display screen and so positioned that the two register in outline, lamps for illuminating the pictorial representation on the display screen through its duplicate on the rear screen, compartments behind the rest of the pictorial representation on the rear screen, each corresponding with a portion thereof, means for illuminating said compartments at desired intervals, and between the display and rear screens a translucent fabric screen of proper texture to hide the pictorial representation on the rear screen except when the same is illuminated as aforesaid.

8. In an advertising apparatus, the combination of a pictorial display visible without illumination and presenting an opaque appearance when illuminated wholly from the front, lamps for illuminating the same from the back, behind this display a second display, means for hiding the same from view until illuminated, lamps for illuminating a definite area or areas of said second display at predetermined intervals, said second display being so positioned that said area or areas thereof will upon illumination appear as an addition or additions to said first display and present an illusion of motion therein.

9. An advertising apparatus in which there is a simulation of motion in a pictorial representation, comprising a translucent surface displaying a pictorial representation, behind this a second surface partly opaque and partly translucent, the translucent portions bearing pictorial representations, compartments located behind said translucent portions of the second screen, each corresponding with a certain portion thereof, means for illuminating the compartments in successive selections, thereby creating the illusion of motion in said pictorial representations intermittently illuminated, and means for hiding the same from view until illuminated.

10. In an advertising apparatus the combination of a translucent screen having a picture or design, the same presenting an opaque appearance when illuminated wholly from the front, behind this a second screen which is opaque except for one or more picture bearing translucent areas, lamps for illuminating the picture or design on the first screen from the back, lamps for intermittently illuminating the translucent picture bearing area or areas of the second screen from the back, and means for hiding the same from view until illuminated.

In testimony whereof, I have signed my name to this specification in the presence of two subscribing witnesses this 10th day of February, 1914.

SYDNEY WADMAN.

Witnesses:
HECTOR M. HOLMES,
STAFFORD F. JOHNSON.